United States Patent
Toshima

(10) Patent No.: US 12,246,560 B2
(45) Date of Patent: Mar. 11, 2025

(54) PNEUMATIC TIRE

(71) Applicant: Sumitomo Rubber Industries, Ltd., Kobe (JP)

(72) Inventor: You Toshima, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 86 days.

(21) Appl. No.: 18/112,169

(22) Filed: Feb. 21, 2023

(65) Prior Publication Data

US 2023/0286331 A1  Sep. 14, 2023

(30) Foreign Application Priority Data

Mar. 9, 2022 (JP) .................... 2022-036507

(51) Int. Cl.
*B60C 15/06* (2006.01)

(52) U.S. Cl.
CPC .......... *B60C 15/06* (2013.01); *B60C 15/0607* (2013.01); *B60C 2015/0621* (2013.01)

(58) Field of Classification Search
CPC . B60C 15/06; B60C 15/0607; B60C 15/0603; B60C 2015/0621; B60C 2015/0614; B60C 2015/0617
See application file for complete search history.

(56) References Cited

U.S. PATENT DOCUMENTS

| | | | | |
|---|---|---|---|---|
| 2005/0103416 | A1* | 5/2005 | Rooney | B60C 11/0316 152/209.19 |
| 2013/0133806 | A1* | 5/2013 | Amano | B60C 15/0018 152/541 |
| 2017/0021679 | A1* | 1/2017 | Wang | B60C 15/0603 |
| 2020/0189319 | A1 | 6/2020 | Kurosawa | |

FOREIGN PATENT DOCUMENTS

| | | | | |
|---|---|---|---|---|
| EP | 0 997 325 | A1 | 5/2000 | |
| EP | 1 559 535 | A1 | 8/2005 | |
| EP | 1 577 122 | A1 | 9/2005 | |
| JP | 2002178724 | A * | 6/2002 | ......... B60C 15/0607 |
| JP | 2005112042 | A * | 4/2005 | |
| JP | 2020026158 | A * | 2/2020 | |
| JP | 2020-93755 | A | 6/2020 | |
| WO | WO 2008/074337 | A1 | 6/2008 | |

OTHER PUBLICATIONS

Extended European Search Report for European Application No. 23157717.2, dated Jul. 26, 2023.

* cited by examiner

*Primary Examiner* — Cedrick S Williams
*Assistant Examiner* — Thomas Frank Schneider
(74) *Attorney, Agent, or Firm* — Birch, Stewart, Kolasch & Birch, LLP

(57) ABSTRACT

A pneumatic tire comprises a bead portion including a reinforcing rubber portion disposed adjacently to an axially outer side of a carcass ply. The reinforcing rubber portion includes an inner rubber layer and an outer rubber layer. The radially outer end of the outer rubber layer is positioned radially outside the radially outer end of the inner rubber layer.

13 Claims, 3 Drawing Sheets

PNEUMATIC TIRE

BACKGROUND OF THE INVENTION

Field of the Invention

The present disclosure relates to a pneumatic tire.

Background Art

Patent document 1 below discloses a pneumatic tire of which bead portion is provided with a main bead apex rubber extending from the radially outer surface of the bead core, and an outer bead apex rubber disposed axially outside the main bead apex rubber. This pneumatic tire is described as having improved durability performance. Patent Document 1: Japanese Patent Application Publication No. 2020-93755

SUMMARY OF THE INVENTION

Problems to be Solved by the Invention

In recent years, particularly, in tires for small trucks to which high loads are applied, it is required to improve the durability of the bead portions (hereinafter referred to as "bead durability").

The present disclosure has been devised in view of the situation as described above, and a primary object thereof is to provide a pneumatic tire of which bead durability can be further improved.

Means for Solving the Problems

According to the present disclosure, a pneumatic tire comprises:
- a pair of bead portions each with a bead core embedded therein, and
- a carcass extending between the bead cores, and comprising a carcass ply, the carcass ply comprising a main portion extending between the bead cores, and a turnup portion turned up around the bead core in each bead portion from the axially inside to the axially outside and extending outwardly in the tire radial direction, wherein
- at least one of the bead portions is provided with a reinforcing rubber portion adjacent to the axially outer side of the turnup portion,
- the reinforcing rubber portion comprises an inner rubber layer, and an outer rubber layer adjacent to the axially outer side of the inner rubber layer, and
- the radially outer end of the outer rubber layer is positioned radially outside the radially outer end of the inner rubber layer.

Effects of the Invention

In the pneumatic tire of the present disclosure, by adopting the above configuration, it is possible to further improve the bead durability.

DETAILED DESCRIPTION OF THE INVENTION

The present disclosure can be applied to tires for passenger cars, heavy duty vehicles and the like, but suitably applied to tires for light trucks (including commercial vehicles).

Taking a pneumatic tire for light trucks as an example, an embodiment of the present disclosure will be described in detail in conjunction with accompanying drawings.

Figure 1:
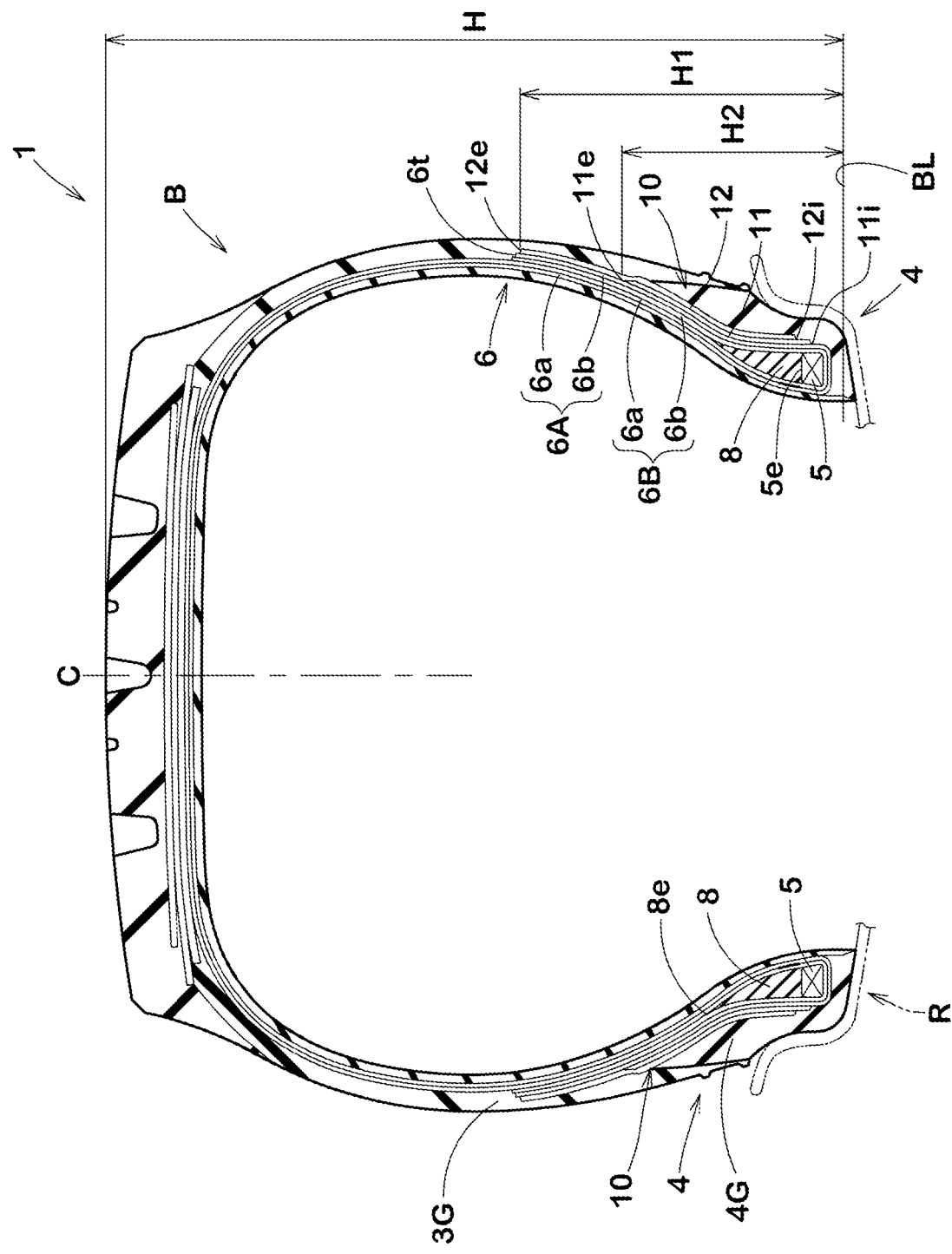
FIG. 1 is a tire meridian cross-sectional view of a tire as an embodiment of the present disclosure.

FIG. 1 is a tire meridian sectional view including the tire rotation axis (not shown) of a pneumatic tire 1 as an embodiment of the present disclosure.

As well known in the art, a pneumatic tire comprises a tread portion whose radially outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

In FIG. 1, shown is the tire under its a normal state.

Here, the normal state is such that the tire is mounted on a standard wheel rim R and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like.

The standard pressure is the "maximum air pressure" in JATMA, the "Inflation Pressure" in ETRTO, the maximum pressure given in the "Tire Load Limits at Various Cold Inflation Pressures" table in TRA or the like.

The standard load is the "maximum load capacity" in JATMA, the "Load Capacity" in ETRTO, the maximum value given in the above-mentioned table in TRA or the like.

In this application including specification and claims, various dimensions, positions and the like of the tire refer to those under a normal state unless otherwise noted.

As shown in FIG. 1, the tire 1 in the present embodiment comprises
a pair of bead portions 4 each with a bead core 5 embedded therein, and
a carcass 6 extending between the bead cores 5.

The carcass 6 comprises at least one carcass ply (6A, 6B). The carcass ply (6A, 6B) extends between the bead portions 4 and is turned up around the bead core 5 in each bead portion 4 from the inside to the outside in the tire axial direction so as to form a pair of turnup portions 6b extending radially outwardly and a main portion 6a therebetween.

The carcass 6 may be composed of only one carcass ply 6A. In the present embodiment, the carcass 6 is composed of two carcass plies 6A and 6B arranged radially inside and outside in the tread portion.

At least one of the bead portions 4 is provided with a reinforcing rubber portion 10 adjacent to the axially outer side of the turnup portion 6b.

The reinforcing rubber portion 10 increases the rigidity of the bead portion 4, suppresses deflection during running, and improves bead durability.

In the present embodiment, each of the bead portions 4 is provided with the reinforcing rubber portion 10.

The reinforcing rubber portion 10 is disposed adjacently to the axially outer side of the turnup portion 6b of the inner carcass ply 6A.

The reinforcing rubber portion 10 comprises an inner rubber layer 11 and an outer rubber layer 12 disposed on the axially outside of the inner rubber layer 11.

In addition, the reinforcing rubber portion 10 may include one or more intermediate rubber layers (not shown) disposed between the inner rubber layer 11 and the outer rubber layer 12.

The radially outer end 12e of the outer rubber layer 12 is positioned radially outside the radially outer end 11e of the inner rubber layer 11.

Such outer rubber layer 12 further increases the rigidity of the bead portion 4 and improves the bead durability.

Further, the outer rubber layer 12 prevents contact between the radially outer end 11e of the inner rubber layer 11 and a sidewall rubber 3G and a clinch rubber 4G which will be described later, and reduces the number of stepped portions formed by the reinforcing rubber portion 10 and the rubbers 3G and 4G. This suppresses the occurrence of bareness of rubber, namely, rubber unfilled part.

Furthermore, since the radially outer end 11e of the inner rubber layer 11 and the radially outer end 12e of the outer rubber layer 12 come into contact with the carcass ply 6A at two different positions, stress concentration on the carcass ply 6A is alleviated, and loosening of the ply 6A is suppressed.

Therefore, the tire 1 of the present disclosure can further improve the bead durability.

In the present embodiment, each of the bead portions 4 is provided with a bead apex rubber 8 and a clinch rubber 4G, and each of the sidewall portions is provided with a sidewall rubber 3G.

The bead apex rubber 8 extends radially outwardly from the bead core 5.

The clinch rubber 4G is disposed axially outside the reinforcing rubber portion 10.

The sidewall rubber 3G is extended to the bead portion so as to be adjacent to a radially outer portion of the clinch rubber 4G.

The axially outer surfaces of the sidewall rubber 3G and the clinch rubber 4G form a part of the outer surface of the tire 1.

The radially outer end 12e of the outer rubber layer 12 is positioned at a radial height H1 from the bead base line BL, and the radial height H1 is preferably 25% or more, more preferably 50% or more, but preferably 75% or less of the tire cross-sectional height H.

Since the radial height H1 is 25% or more of the tire section height H, it is possible to maintain high lateral rigidity against the load applied during running.

Since the radial height H1 is 75% or less of the tire section height H, strain at the radially outer end 12e of the outer rubber layer 12 in the buttress portion B is reduced, and damage is suppressed.

The tire section height H is the distance in the tire radial direction from the bead base line BL to the radially outermost position on the tire.

The bead base line BL is a straight line drawn parallel to the tire axial direction, passing through the position corresponding to the wheel rim diameter determined by the standard on which the tire is based. (see for example, JATMA)

In the present embodiment, the radially outer end 12e of the outer rubber layer 12 is positioned radially inward of the radially outer end 6t of the turnup portion 6b of the inner carcass ply 6A. Thereby, the outer rubber layer 12 will be less likely to have a level difference and damage will be suppressed.

In each bead portion, the radially inner end 12i of the outer rubber layer 12 and the radially inner end 11i of the inner rubber layer 11 are displaced in the tire radial direction from each other. This suppresses concentration of strain on the carcass ply 6A at the radially inner ends 11i and 12i.

The radial height H2 of the radially outer end 11e of the inner rubber layer 11 from the bead base line BL is preferably 25% or more, more preferably 30% or more, but preferably 60% or less, more preferably 55% or less of the tire section height H. Since the radial height H2 is 25% or more of the tire section height H, it is possible to maintain high lateral rigidity against the load applied during running. Since the radial height H2 is 60% or less of the tire section height H, excessive increase in rigidity of the bead portion 4 is suppressed.

The first distance (H1−H2) in the tire radial direction between the radially outer end 12e of the outer rubber layer 12 and the radially outer end 11e of the inner rubber layer 11 is preferably 10% or more, more preferably 15% or more, preferably 30% or less, but more preferably 25% or less of the tire section height H.

Thereby, the strain generated at the outer ends 11e and 12e is appropriately dispersed, and the effect of improving the lateral rigidity by the reinforcing rubber portion 10 is highly exhibited.

Figure 2:
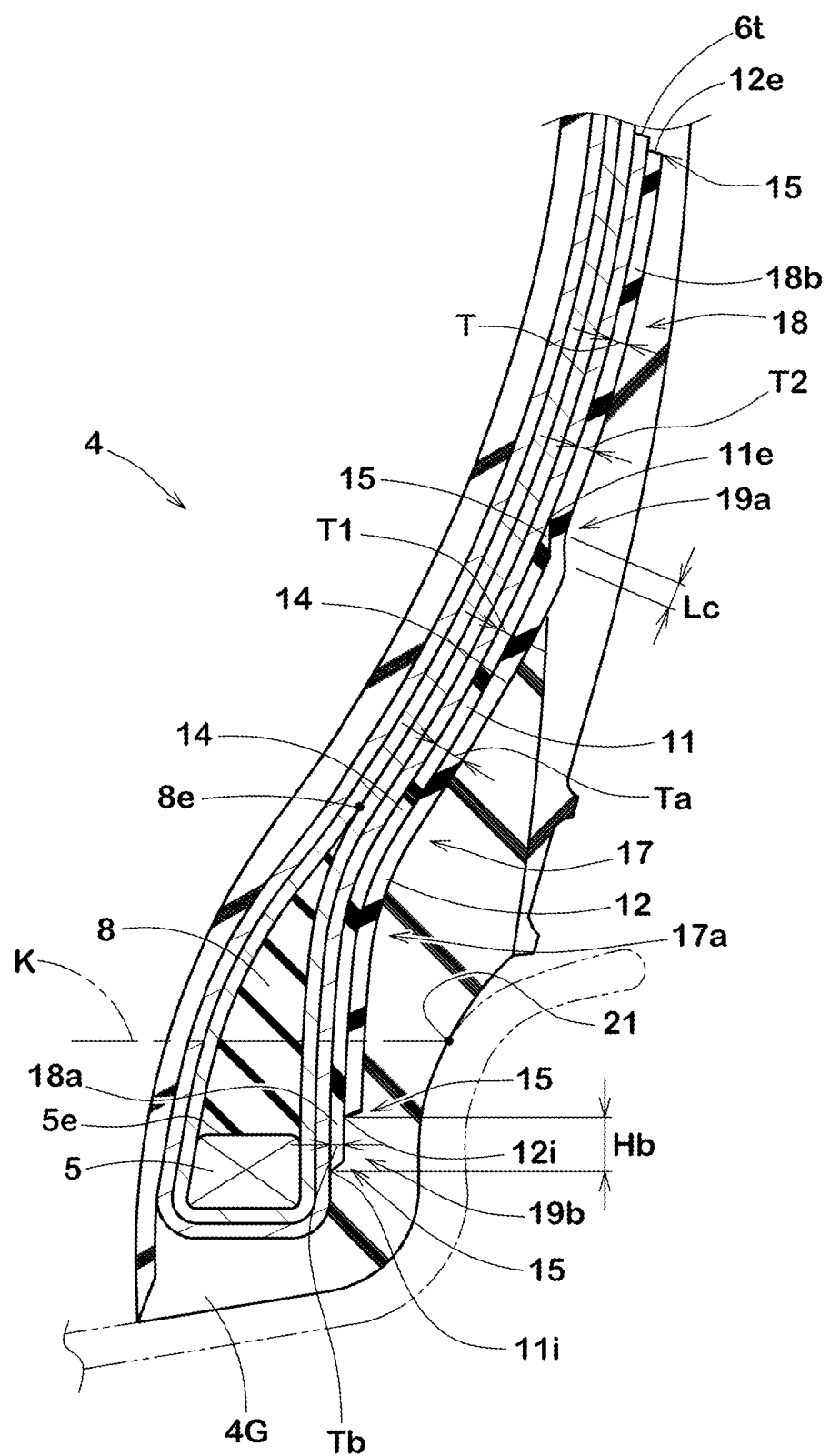
FIG. 2 is an enlarged view of the bead portion of FIG. 1.

FIG. 2 is an enlarged view of the bead portion 4.

As shown in FIG. 2, the radially inner end 12i of the outer rubber layer 12 is positioned radially outside the radially outer end 5e of the bead core 5. Thereby, the rigidity in the vicinity of the bead core 5 is suppressed from becoming excessively high, thereby suppressing deterioration in fitting of the bead portion to the wheel rim.

The radially inner end 11i of the inner rubber layer 11 is located radially inside the radially outer end 5e of the bead core 5. Thereby, the lateral rigidity of the bead portion 4 is maintained high.

Thus, the radially inner end 12i of the outer rubber layer 12 is located radially outside the radially inner end 11i of the inner rubber layer 11 in the present embodiment.

The radially inner end 12i portion of the outer rubber layer 12 overlaps with the bead apex rubber 8 in the tire radial direction.

The second distance Hb in the tire radial direction between the radially inner end 12i of the outer rubber layer 12 and the radially inner end 11i of the inner rubber layer 11 is preferably 5% or more, more preferably 7% or more, but preferably 15% or less, more preferably 13% or less of the first distance (H1−H2).

Thereby, the rigidity in the vicinity of the bead core 5 can be effectively increased.

It is preferable that the loss tangent δ2 of the outer rubber layer 12 is larger than the loss tangent δ1 of the inner rubber layer 11.

Such outer rubber layer 12 has high rigidity, and exerts an effect of suppressing strain and an effect of improving the lateral rigidity.

Since the inner rubber layer 11 has a smaller hysteresis loss than the outer rubber layer 12, the amount of heat generated is suppressed. Thereby, the inner rubber layer 11 suppresses the heat of the outer rubber layer 12 from being transferred to the carcass ply 6A, and the separation between the inner rubber layer 11 and the carcass ply 6A is suppressed. Therefore, the bead durability is greatly improved.

In order to effectively derive the above effects, the loss tangent δ2 of the outer rubber layer 12 is preferably 0.12 or more, more preferably 0.14 or more, but preferably 0.25 or less, more preferably 0.20 or less.

The loss tangent δ1 of the inner rubber layer 11 is preferably 60% or more, more preferably 65% or more, but preferably 90% or less, more preferably 85% or less of the loss tangent δ2 of the outer rubber layer 12.

In this specification, the loss tangent δ and the complex elastic modulus E* described later are measured using a dynamic viscoelasticity measuring device (Iplexer series manufactured by GABO) under the following conditions in accordance with the provisions of JIS-K6394 "Rubber, vulcanized or thermoplastic—Determination of dynamic properties—General guidance".

Initial strain: 10%
 Dynamic strain amplitude: +/−2%
 Frequency: 10 Hz
 Deformation mode: Stretch
 Measurement temperature: 70 deg. C.

The complex elastic modulus E*2 of the outer rubber layer 12 is preferably 60% or more of the complex elastic modulus E*1 of the inner rubber layer 11.

As a result, the lateral rigidity of the outer rubber layer 12 disposed on the outer side in the tire axial direction is maintained high, and distortion under high load conditions is suppressed, thereby improving the bead durability.

If the complex elastic modulus E*2 of the outer rubber layer 12 is excessively larger than the complex elastic modulus E*1 of the inner rubber layer 11, stepped difference in rigidity at the radially outer end 12e and the radially inner end 12i of the outer rubber layer 12 become large, and
 there is a possibility that the bead durability may deteriorate.

For this reason, it is preferable that the complex elastic modulus E*2 of the outer rubber layer 12 is larger than the complex elastic modulus E*1 of the inner rubber layer 11. And the complex elastic modulus E*2 is preferably 200% or less, more preferably 190% or less of the complex elastic modulus E*1.

Although not particularly limited, the complex elastic modulus E*2 of the outer rubber layer 12 is preferably 60 MPa or more, more preferably 80 MPa or more, but preferably 140 MPa or less, more preferably 120 MPa or less.

Figure 3:
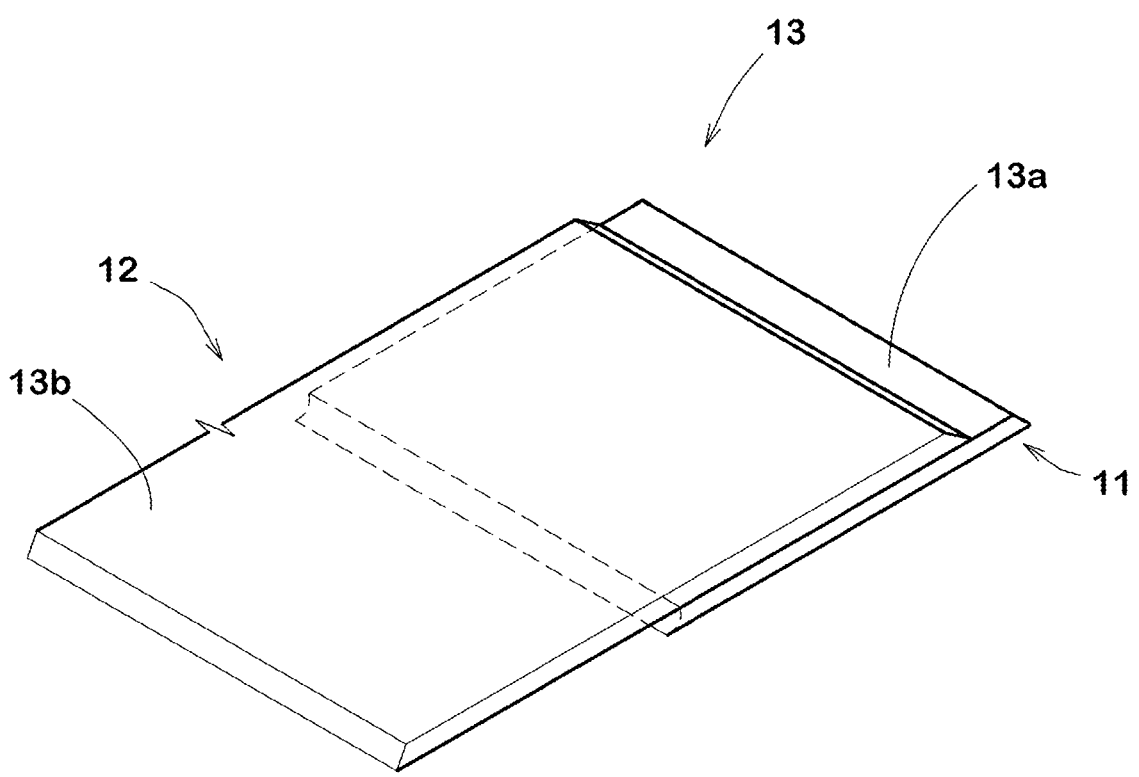
FIG. 3 is a perspective view of a sheet-shaped rubber member.

Each of the inner rubber layer 11 and the outer rubber layer 12 is made of a sheet-shaped rubber member 13 (shown in FIG. 3).

The sheet-shaped rubber member 13 is obtained, for example, by cutting a raw rubber sheet (not shown) extruded by a rubber extruder.

Such sheet-shaped rubber member 13 facilitates the production of the reinforcing rubber portion 10 for various tire sizes and enhances its versatility.

FIG. 3 is a perspective view of each sheet-shaped rubber member 13.

As shown in FIG. 3, in the present embodiment, the sheet-shaped rubber member 13 includes a first sheet-shaped rubber member 13a for forming the inner rubber layer 11 and a second sheet-shaped rubber member 13b for forming the outer rubber layer 12.

In the present embodiment, the reinforcing rubber portion 10 is formed by laminating these sheet-shaped rubber members 13a and 13b in the tire axial direction.

Each sheet-shaped rubber member 13 is vulcanized to form the inner rubber layer 11 and the outer rubber layer 12.

As shown in FIG. 2, the inner rubber layer 11 has a constant-thickness portion 14 having a constant thickness, and reduced-thickness portions 15 whose thickness decreases toward its radially inner end 11i and radially outer end 11e, and the outer rubber layer 12 has a constant-thickness portion 14 having a constant thickness, and reduced-thickness portions 15 whose thickness decreases toward its radially inner end 12i and its radially outer end 12e.

The reduced-thickness portion 15 serves to alleviate the rigidity stepped difference and improve the bead durability. Here, the constant-thickness portion is a portion where the thickness variation is at most 0.2 mm per 1 mm in the tire radial direction.

For example, the length Lc of each reduced-thickness portion 15 is preferably not more than 5 mm, more preferably not more than 3 mm.

The reinforcing rubber portion 10 has a first portion 17 where the two sheet-shaped rubber members 13 are laminated, and
 a second portion 18 where the two sheet-shaped rubber members 13 are not laminated (namely, a portion 18 is formed by only one sheet-shaped rubber member 13).

In the present embodiment, the first portion 17 is composed of the inner rubber layer 11 and the outer rubber layer 12.

In the present embodiment, the second portion 18 includes a radially inner second portion 18a formed by only the inner rubber layer 11, and
 a radially outer second portion 18b formed by only the outer rubber layer 12.

In the present embodiment, the first portion 17 is positioned between the second inner portion 18a and the second outer portion 18b.

The first portion 17 includes a maximum thickness portion 17a.

The maximum thickness portion 17a is formed by overlapping the constant-thickness portion 14 of the inner rubber layer 11 and the constant-thickness portion 14 of the outer rubber layer 12.

The maximum thickness portion 17a does not include the portion 19a where the reduced-thickness portion 15 of the inner rubber layer 11 and the constant-thickness portion 14 of the outer rubber layer 12 overlap, and
 the portion 19b where the reduced-thickness portion 15 of the outer rubber layer 12 and the constant-thickness portion 14 of the inner rubber layer 11 overlap.

It is preferable that the first portion 17 is positioned across a straight line K, which is drawn parallel to the tire axial direction, passing through the radial outer end 21 of the contact position between the tire 1 and the normal rim R under the normal state of the tire.

The vicinity of the radially outer end 21 is a portion to which a large bending load acts while the vehicle is running.

By disposing the first portion 17 in the same position in the tire radial direction as the radially outer end 21, deformation at the radially outer end 21 is suppressed, and the bead durability is further improved.

In order to drive this effect more effectively, it is preferred that the maximum thickness portion 17a is positioned across the straight line K.

The difference (Ta−Tb) between the thickness Ta of the first portion 17 and the thickness Tb of the second portion 18 is preferably 1 mm or more.

Since the difference (Ta−Tb) is 1 mm or more, the rigidity of the first portion 17 is increased and the durability is improved.

If the difference (Ta−Tb) is excessively large, the rigidity of the first portion 17 becomes too large, and there is a possibility that ride comfort performance is deteriorated. From this point of view, the difference (Ta−Tb) is preferably 3.5 mm or less, more preferably 3.0 mm or less.

The thickness Ta of the first portion 17 is the thickness of the maximum thickness portion 17a.

The thickness Tb of the second portion 18 is the thickness of the constant-thickness portion 14 of the inner rubber layer 11.

The thickness Tb of the second portion 18 may be the thickness of the constant-thickness portion 14 of the outer rubber layer 12.

In order to effectively derive the above effects, the thickness Ta of the first portion 17 is preferably not less than 1.5 times, more preferably not less than 1.8 times, but preferably not more than 2.5 times, more preferably not more than 2.3 times the thickness Tb of the second portion 18.

The thickness T1 of the inner rubber layer 11 and the thickness T2 of the outer rubber layer 12 are preferably 0.5 mm or more, more preferably 0.8 mm or more, but preferably 2.0 mm or less, more preferably 1.5 mm or less.

The bead apex rubber 8 in this example is formed in a triangular shape in a tire meridian cross section as shown in FIG. 2.

Although not particularly limited, it is preferred that, at a radial position at a radial height of the radially outer end 8e of the bead apex rubber 8, there are the inner rubber layer 11 and the outer rubber layer 12.

In the present embodiment, at a radial position at a radial height of the radially outer end 8e of the bead apex rubber 8, there is disposed the maximum thickness portion 17a.

The complex elastic modulus E*3 of the bead apex rubber 8 is preferably smaller than the complex elastic modulus E*1 of the inner rubber layer 11.

The complex elastic modulus E*3 of the bead apex rubber 8 is preferably smaller than the complex elastic modulus E*2 of the outer rubber layer 12.

The complex elastic modulus of each of the sidewall rubber 3G and the clinch rubber 4G is smaller than the complex elastic modulus E*1 of the inner rubber layer 11. Thereby, basic ride comfort performance is exhibited.

The complex elastic modulus E*b of the sidewall rubber 3G is preferably not less than 5%, more preferably not less than 10%, but preferably not more than 50%, more preferably not more than 40% of the complex elastic modulus E*1 of the inner rubber layer 11.

The complex elastic modulus E*c of the clinch rubber 4G is preferably not less than 10%, more preferably not less than 20%, but preferably not more than 70%, more preferably not more than 60% of the complex elastic modulus E*1 of the inner rubber layer 11.

While detailed description has been made of a preferable embodiment of the present invention, the present invention can be embodied in various forms without being limited to the illustrated embodiment.

Comparison Tests

Based on the structure shown in FIG. 1, pneumatic tires were experimentally manufactured, and tested for the bead durability and steering stability.

Specifications of the pneumatic tires are shown in Table 1, wherein the values of tan δ1 and tan δ2 are indicated by an index based on the value of tan δ1 of Comparative Example 1 being 100, and the values of complex elastic moduli E*1 and E*2 are indicated by an index based on the value of E*1 of Comparative Example 1 being 100, wherein tan δ1 of the inner rubber layer of Comparative Example 1 was 0.10, and E*1 of the inner rubber layer of Comparative Example 1 was 20 MPa.

<Bead Durability Test>

Using a tire test drum, each tire was run under the following conditions, and the running distance until the bead portion(s) was damaged was measured.

Tire inflation pressure: 220 kPa

Vertical tire load: 19.84 kN

Running speed: 20 km/h

Wheel rim size: 6.0 J

The results are indicated in Table 1 by an index based on the running distance of Comparative Example 1 being 100, wherein the larger the numerical value, the better the bead durability.

<Steering Stability Test>

Using a test vehicle (2000cc small truck) on all wheels of which test tires were mounted, the test driver evaluated steering stability performance based on stability and maneuverability when running on a dry asphalt test course at high speed.

The results are indicated in Table 1 by an index based on Comparative Example 1 being 100, wherein the higher the value, the better the steering stability performance.

TABLE 1

| Tire | Comparative example 1 | Example 1 | Example 2 |
|---|---|---|---|
| H1/H (%) | 25 | 25 | 55 |
| H2/H (%) | 20 | 75 | 75 |
| tanδ1 | 100 | 80 | 80 |
| tanδ2 | 100 | 130 | 130 |
| E*1 | 100 | 80 | 80 |
| E*2 | 100 | 130 | 130 |
| Ta (mm) | 3 | 3 | 3 |
| Tb (mm) | 1.5 | 1 | 1 |
| Bead durability | 100 | 120 | 120 |
| Steering stability | 60 | 80 | 100 |

From the test results, it was confirmed that the bead durability of Example tires according to the present disclosure were improved as compared to Comparative example tire, and the steering stability performance of Examples tires was maintained.

Statement of the Present Disclosure

The present disclosure is as follows:

Disclosure 1: A pneumatic tire comprising:
a pair of bead portions each with a bead core embedded therein, and
a carcass extending between the bead cores, and comprising a carcass ply, the carcass ply comprising a main portion extending between the bead cores, and a turnup portion turned up around the bead core in each bead portion from the axially inside to the axially outside and extending outwardly in the tire radial direction,
wherein
at least one of the bead portions is provided with a reinforcing rubber portion adjacent to the axially outer side of the turnup portion,
the reinforcing rubber portion comprises an inner rubber layer and an outer rubber layer adjacent to the axially outer side of the inner rubber layer, and
the radially outer end of the outer rubber layer is positioned radially outside the radially outer end of the inner rubber layer.

Disclosure 2: The pneumatic tire according to Disclosure 1, wherein the height in the tire radial direction, of the radially outer end of the outer rubber layer from a bead base line is 25% to 75% of the section height of the tire.

Disclosure 3: The pneumatic tire according to Disclosure 1 or 2, wherein the radially inner end of the outer rubber layer is located radially outside the radially inner end of the inner rubber layer.

Disclosure 4: The pneumatic tire according to Disclosure 3, wherein each of the inner rubber layer and the outer rubber layer is made of a sheet-shaped rubber member, and the reinforcing rubber portion includes a first portion where the sheet-shaped rubber members are laminated, and
the first portion is positioned across a straight line which is drawn parallel to the tire axial direction, passes through a radially outer end of a contact position between the tire and a standard wheel rim under a normal state such that the tire is mounted on the standard wheel rim, and inflated to a standard pressure but loaded with no tire load.

Disclosure 5: The pneumatic tire according to Disclosure 4, wherein a thickest portion of the first portion is positioned across the straight line.

Disclosure 6: The pneumatic tire according to Disclosure 4 or 5, wherein the reinforcing rubber portion includes a second portion where the sheet-shaped rubber members are not laminated, and
the difference (Ta−Tb) between the thickness Ta of the first portion and the thickness Tb of the second portion is 1 mm or more.

Disclosure 7: The pneumatic tire according to Disclosure 6, wherein the thickness Ta of the first portion is 1.5 to 2.5 times the thickness Tb of the second portion.

Disclosure 8: The pneumatic tire according to any one of Disclosures 1 to 7, wherein the loss tangent δ2 of the outer rubber layer is larger than the loss tangent δ1 of the inner rubber layer.

Disclosure 9: The pneumatic tire according to any one of Disclosures 1 to 8, wherein the complex elastic modulus E*2 of the outer rubber layer is 60% or more of the complex elastic modulus E*1 of the inner rubber layer.

Disclosure 10: The pneumatic tire according to Disclosure 9, wherein the complex elastic modulus E*2 of the outer rubber layer is greater than the complex elastic modulus E*1 of the inner rubber layer.

Disclosure 11: The pneumatic tire according to any one of Disclosures 1 to 10, wherein the outer rubber layer and the inner rubber layer each include a constant-thickness portion having a constant thickness.

DESCRIPTION OF THE REFERENCE SIGNS

1 Pneumatic tire
4 Bead portion
6A Carcass ply
10 Reinforcing rubber portion
11 Inner rubber layer
11e Radially outer end of Inner rubber layer
12 Outer rubber layer
12e Radially outer end of Outer rubber layer

The invention claimed is:

1. A pneumatic tire comprising:
a pair of bead portions each with a bead core embedded therein, and
a carcass extending between the bead cores, and comprising a carcass ply,
the carcass ply comprising a main portion extending between the bead cores, and a turnup portion turned up around the bead core in each bead portion from the axially inside to the axially outside and extending outwardly in the tire radial direction,
wherein
at least one of the bead portions is provided with a reinforcing rubber portion adjacent to an axially outer side of the turnup portion,
the reinforcing rubber portion comprises an inner rubber layer, and an outer rubber layer adjacent to an axially outer side of the inner rubber layer,
wherein
a loss tangent δ2 of the outer rubber layer is 0.12 or more but 0.25 or less,
a loss tangent δ1 of the inner rubber layer is 60% or more but 90% or less of the loss tangent δ2 of the outer rubber layer,
a complex elastic modulus E*2 of the outer rubber layer is 60 MPa or more but 140 MPa or less, and
the complex elastic modulus E*2 of the outer rubber layer is 60% or more but 200% or less of a complex elastic modulus E*1 of the inner rubber layer,
wherein
a radially outer end of the outer rubber layer is positioned radially outside a radially outer end of the inner rubber layer,
a radially inner end of the outer rubber layer is positioned radially outside a radially inner end of the inner rubber layer,
the inner rubber layer and the outer rubber layer closely overlap with each other from the radially inner end of the outer rubber layer to the radially outer end of the inner rubber layer,
wherein
a thickness T1 of the inner rubber layer is 0.5 mm or more but 2.0 mm or less,
a thickness T2 of the outer rubber layer is 0.5 mm or more but 2.0 mm or less,
each of the inner rubber layer and the outer rubber layer consists of a radially outer reduced-thickness portion, a radially inner reduced-thickness portion, and a constant-thickness portion therebetween, wherein
the constant-thickness portion has a constant thickness,
the radially outer reduced-thickness portion has a thickness decreasing toward its radially outer end, the radially inner reduced-thickness portion has a thickness decreasing toward its radially inner end, and the radially outer and inner reduced-thickness portions each have a length Lc of not more than 5 mm, wherein a radial height H1 of the radially outer end of the outer rubber layer from a bead base line is 25% or more but 75% or less of a tire cross-sectional height H, a radial height H2 of the radially outer end of the inner rubber layer from the bead base line is 25% or more but 60% or less of the tire section height H, a second distance Hb in the tire radial direction between the radially inner end of the outer rubber layer and the radially inner end of the inner rubber layer, is 5% or more but 15% or less of a difference (H1−H2) between the radial height H1 and the radial height H2, wherein the radially inner end of the inner rubber layer is located at a position in the tire radial direction between a radially outer end and a radially inner end of the bead core, wherein the axially inner surface of the reinforcing rubber portion is directly adjacent to the carcass ply turnup portion from the radially outer end to the radially inner end of the reinforcing rubber portion, and the axially outer surface of the reinforcing rubber portion is directly adjacent to a clinch rubber forming a tire outer surface in the bead portion and a sidewall rubber forming a tire outer surface in a tire sidewall portion, wherein the loss tangents are measured in accordance with the provisions of JIS-K6394 under the following conditions:
Initial Strain of 10%
Dynamic strain amplitude of +/−2%
Frequency of 10 Hz
Deformation mode is stretch
Measurement temperature is 70 deg. C.

2. The pneumatic tire according to claim 1, wherein
the reinforcing rubber portion includes a first portion where the inner rubber layer and the outer rubber layer closely overlap with each other, and
the first portion extends radially across a straight line which is drawn parallel to the tire axial direction, passing through a radially outer end of a contact position between the tire and a standard wheel rim under a normal state such that the tire is mounted on the standard wheel rim, and inflated to a standard pressure but loaded with no tire load.

3. The pneumatic tire according to claim 2, wherein
a thickest portion of the first portion where the constant-thickness portion of the inner rubber layer and the constant-thickness portion of the outer rubber layer closely overlap with each other extends radially across the straight line.

4. The pneumatic tire according to claim 2, wherein
the reinforcing rubber portion includes a second portion defined by a portion of one of the inner rubber layer and the outer rubber layer which does not overlap with the other of the inner rubber layer and the outer rubber layer, and a difference (Ta−Tb) between a thickness Ta of the first portion and a thickness Tb of the second portion is 1 mm or more.

5. The pneumatic tire according to claim 3, wherein
the reinforcing rubber portion includes a second portion defined by a portion of one of the inner rubber layer and the outer rubber layer which does not overlap with the other of the inner rubber layer and the outer rubber layer, and a difference (Ta−Tb) between a thickness Ta of the first portion and a thickness Tb of the second portion is 1 mm or more.

6. The pneumatic tire according to claim 4, wherein
the thickness Ta of the first portion is 1.5 to 2.5 times the thickness Tb of the second portion.

7. The pneumatic tire according to claim 5, wherein
the thickness Ta of the first portion is 1.5 to 2.5 times the thickness Tb of the second portion.

8. The pneumatic tire according to claim 1, wherein
a complex elastic modulus $E^*b$ of the sidewall rubber is not less than 5% but not more than 50% of the complex elastic modulus $E^*1$ of the inner rubber layer, and a complex elastic modulus $E^*c$ of the clinch rubber is not less than 10% but not more than 70% of the complex elastic modulus $E^*1$ of the inner rubber layer.

9. The pneumatic tire according to claim 8, wherein
a complex elastic modulus $E^*3$ of a bead apex rubber is smaller than the complex elastic modulus $E^*1$ of the inner rubber layer and smaller than the complex elastic modulus $E^*2$ of the outer rubber layer.

10. The pneumatic tire according to claim 8, wherein
a complex elastic modulus $E^*3$ of a bead apex rubber is smaller than the complex elastic modulus $E^*1$ of the inner rubber layer and smaller than the complex elastic modulus $E^*2$ of the outer rubber layer.

11. The pneumatic tire according to claim 1, wherein
the carcass comprises said carcass ply as a first carcass ply, and a second carcass ply, and
the second carcass ply comprises a main portion extending between the bead cores, and a turnup portion turned up around the bead core in each bead portion from the axially inside to the axially outside and extending radially outwardly along said turnup portion of the first carcass ply on the axially inside thereof.

12. The pneumatic tire according to claim 9, wherein
the carcass comprises said carcass ply as a first carcass ply, and a second carcass ply, and
the second carcass ply comprises a main portion extending between the bead cores, and a turnup portion turned up around the bead core in each bead portion from the axially inside to the axially outside and extending radially outwardly along said turnup portion of the first carcass ply on the axially inside thereof.

13. The pneumatic tire according to claim 10, wherein
the carcass comprises said carcass ply as a first carcass ply, and a second carcass ply, and
the second carcass ply comprises a main portion extending between the bead cores, and a turnup portion turned up around the bead core in each bead portion from the axially inside to the axially outside and extending radially outwardly along said turnup portion of the first carcass ply on the axially inside thereof.

* * * * *